(12) United States Patent
Mascitto

(10) Patent No.: US 9,549,234 B1
(45) Date of Patent: Jan. 17, 2017

(54) METHODS AND APPARATUSES FOR IMPLEMENTING A LAYER 3 INTERNET PROTOCOL (IP) ECHO RESPONSE FUNCTION ON A SMALL FORM-FACTOR PLUGGABLE (SFP) TRANSCEIVER AND PROVIDING A UNIVERSAL INTERFACE BETWEEN AN SFP TRANSCEIVER AND NETWORK EQUIPMENT

(71) Applicant: Enginuity Communications Corporation, St. Charles, IL (US)

(72) Inventor: Marco Mascitto, Montreal (CA)

(73) Assignee: Enginuity Communications Corporation, St. Charles, IL (US)

( * ) Notice: Subject to any disclaimer, the term of this patent is extended or adjusted under 35 U.S.C. 154(b) by 341 days.

(21) Appl. No.: 14/138,280

(22) Filed: Dec. 23, 2013

Related U.S. Application Data

(60) Provisional application No. 61/747,042, filed on Dec. 28, 2012, provisional application No. 61/779,621, filed on Mar. 13, 2013.

(51) Int. Cl.
*H04L 12/26* (2006.01)
*H04Q 11/00* (2006.01)

(52) U.S. Cl.
CPC ...... *H04Q 11/0071* (2013.01); *H04Q 11/0066* (2013.01)

(58) Field of Classification Search
CPC .......................................... H04L 43/10–43/50
USPC .... 370/241.1, 248, 249, 252, 254, 328, 412; 398/137, 58, 9; 439/607.2; 455/574
See application file for complete search history.

(56) References Cited

U.S. PATENT DOCUMENTS

| | | |
|---|---|---|
| 7,477,847 B2 | 1/2009 | Hofmeister et al. |
| 7,693,178 B2 | 4/2010 | Wojtowicz |
| 7,933,518 B2 | 4/2011 | Li et al. |
| 7,995,574 B2 | 8/2011 | Suri |
| 8,000,607 B2 | 8/2011 | Hsieh |
| 8,107,820 B2 | 1/2012 | Hotchkiss et al. |
| 8,224,401 B1 | 7/2012 | Schlichter |
| 2004/0161240 A1 | 8/2004 | Weber |
| 2006/0209886 A1 | 9/2006 | Silberman et al. |
| 2007/0280106 A1 | 12/2007 | Lund |
| 2010/0280858 A1 | 11/2010 | Bugenhagen |
| 2011/0135312 A1 | 6/2011 | El-Ahmadi et al. |

(Continued)

FOREIGN PATENT DOCUMENTS

WO   WO 2010/145076 A1   12/2010

OTHER PUBLICATIONS

"RAD to Unveil Unique Ethernet Demarcation SFP at Ethernet Expo Americas," press release Oct. 25, 2012, www.rad.com (3 pgs.).

(Continued)

*Primary Examiner* — Jamal Javaid
*Assistant Examiner* — Wali Butt
(74) *Attorney, Agent, or Firm* — Dickinson Wright PLLC

(57) ABSTRACT

A small form factor pluggable device (SFP) or other compact transceiver device is provided at a subscriber's site and is configured to perform Layer 3 testing (e.g., ICMP echo request and response operations) for testing connectivity across networks. A universal interface coupling a conventional transceiver to host equipment is also disclosed which has components that can provide additional functionality to the transceiver while maintaining compatibility between the transceiver and the host equipment.

14 Claims, 12 Drawing Sheets

(56) References Cited

U.S. PATENT DOCUMENTS

| | | | |
|---|---|---|---|
| 2011/0191632 A1* | 8/2011 | Miller | G06F 11/28 |
| | | | 714/27 |
| 2011/0262147 A1 | 10/2011 | Lavoie et al. | |
| 2011/0283140 A1* | 11/2011 | Stevens | H04L 12/2697 |
| | | | 714/27 |
| 2012/0045202 A1 | 2/2012 | Jiang et al. | |
| 2012/0102239 A1 | 4/2012 | Huang | |
| 2012/0182900 A1 | 7/2012 | Davari | |
| 2012/0301134 A1* | 11/2012 | Davari | H04L 41/5038 |
| | | | 398/9 |
| 2012/0301151 A1 | 11/2012 | Hu et al. | |
| 2013/0229927 A1* | 9/2013 | Chouinard | H04L 43/50 |
| | | | 370/249 |
| 2015/0052600 A1* | 2/2015 | Weinsberg | H04L 12/4641 |
| | | | 726/13 |
| 2015/0281021 A1* | 10/2015 | Ling | H04L 43/0811 |
| | | | 370/248 |

OTHER PUBLICATIONS

AFCT-5017Z SFP Extender Board, Application Note 5413, Aug. 3, 2010, www.avagotech.com (6 pgs.).
http://www.accedian.com/en/products/nanonid.html, printed on Dec. 19, 2012 (4 pgs.).
Internet Control Message Protocol, RFC 792, Sep. 1981, https://wiki.tools.ietf.org/html/rfc972 (21 pgs.).
Internet Control Message Protocol for the Internet Protocol Version 6 (IPv6) Specification, RFC 4443, Mar. 2006, https://tools.ietf.org/html/rfc4443 (24 pgs.).

* cited by examiner

METHODS AND APPARATUSES FOR IMPLEMENTING A LAYER 3 INTERNET PROTOCOL (IP) ECHO RESPONSE FUNCTION ON A SMALL FORM-FACTOR PLUGGABLE (SFP) TRANSCEIVER AND PROVIDING A UNIVERSAL INTERFACE BETWEEN AN SFP TRANSCEIVER AND NETWORK EQUIPMENT

This application claims the benefit of U.S. provisional application Ser. No. 61/747,042, filed Dec. 28, 2012, and of U.S. provisional application Ser. No. 61/779,621, filed Mar. 13, 2013, the entire contents of which are incorporated herein in their entireties.

BACKGROUND OF THE INVENTION

Field of the Invention

The present invention relates to enhanced transceivers (e.g., Small Form-factor Pluggable (SFP) optical transceivers), or enhanced universal interfaces for transceivers, for deployment in a subscriber's network that provide Internet Protocol functionality (e.g., using Layer 3 protocols such as IPv4, IPv6, ICMP, ICMPv6) for network layer (Layer 3) testing and not just physical layer (Layer 1) testing or data link layer (Layer 2) testing. The present invention also relates generally to apparatuses and methods for providing universal interfaces between transceivers (e.g., SFP optical transceivers and other types of optical and electrical transceivers) and network equipment having additional transceiver functionality.

GLOSSARY

The following definitions, terminology and acronyms are provided for the purposes of illustrations and examples:

The Open Source Interconnection (OSI) 7 Layer model of computer networking was developed by the International Organization for Standardization (ISO/IEC 7498-1). Three of the seven layers are briefly described here, wherein:

Layer 1 is the Physical layer (e.g., transmission and reception of unstructured raw bit stream over a physical medium such as data encoding, physical medium attachment, transmission technique and physical medium transmission in bits or volts);

Layer 2 is the Data Link layer (e.g., the error-free transfer of data frames from one node to another over the Physical layer such as establishing and terminating logical links between nodes, physical addressing, media access control (MAC) sublayer, link layer control (LLC) sublayer, frame traffic control and sequencing, and frame error checking); and Layer 3 is the Network layer (e.g., operations of a subnetwork to determine which physical path the data takes such as routing, subnetwork traffic control, frame fragmentation, logical-physical address mapping and subnetwork usage accounting)

CE: Customer Equipment is a switch/router that is located at the customer premise and connects (directly or indirectly) to Provide Edge device (PE).

CLE/NTE: Customer Located Equipment/Network Termination Equipment.

CPE: Customer Premise Equipment is electronics equipment that is placed at the customer site, but belongs to the service provider.

MEF: Metro Ethernet Forum is an industry forum that is chartered to define Ethernet services and interoperable capabilities.

MAC: Media Access Control is a Data link layer protocol used by Ethernet.

MPLS: Multi-Protocol Label Switching is a standard protocol that is used in routed networks.

NE: Network Element is any router or switch that forwards and processes the messages.

NID: Network Identification Device, or sometimes called Network Demarcation Device (NDD). NID is installed at customer premise so that a communication service provider can diagnose and ensure service delivery up to the NID.

NMS: Network Management System is the software that controls the complete network of a service provider.

OAM: Operation, Administration and Management. OAM is a tool used by communication service providers to manage and diagnose communication problems.

PE: Provide Edge device is a switch/router that is located at the edge of a SP network and connects (directly or indirectly) to customer equipment (CE).

SFP: small form-factor pluggable (SFP) is a compact, hot-pluggable transceiver used for both telecommunication and data communications applications. The form factor and electrical interface are specified by a multi-source agreement (MSA) and standardized by the SFF Committee in the SFP specification INF-8074i available at ftp://ftp.seagate.com/sff/INF-8074.pdf, in extensions to the SFP MSA document such as other SFF documents available from the SFF Committee, and in similar specifications for other types of transceivers. An SFP is plugged into communication requirements, such as switch and routers, to provide a media conversion, such as converting electrical signals to optical for transport over fiber optics. For example, an SFP transceiver interfaces a network device motherboard (for a switch, router, media converter or similar device) to a fiber optic or copper networking cable. SFP transceivers are designed to support SONET, Gigabit Ethernet, Fibre Channel, and other communications standards and have been used for data rates of 1 Gbit/s to 5 Gbit/s. Other form-factor pluggable transceivers are available which operate at higher rates.

SP: Service Provider is a company that provides data, voice (and possibly video communication), and connectivity for the customers. Example of SP is AT&T and Verizon.

WAN: Wide Area Network refers to a network that covers a large geographical area.

802.1 and 802.3 are IEEE (Institute of Electrical and Electronics Engineers) standards for Ethernet communications.

2. Description of Related Art

With reference to FIG. 1, a Network Interface Device (NID) 18 is a device that governs the flow of communications of packets between networks or portions of networks 12 and 24. For example, a NID 18 is generally used as a Demarcation Device to mark the hand-off point between a service provider indicated generally at 12 and a customer or subscriber site 14, or between two service providers 12. The main function of a NID 18 is to permit the service provider 12 to monitor the health of the connection and the service up to the NID 18 (hand-off point) using, for example, Layer 1 testing (e.g., loopback operations) or Layer 2 testing (e.g., OAM operations). A NID 18 could also perform more advanced functions, such as rate adaptation, media conversion, policing, shaping, security, performance monitoring, statistics collection and even packet header manipulation. A NID generally could have two or more physical ports such as a port to connect to a service provider's local access fiber 16 and a port that connects the patch fiber 22 to the subscriber's network 24.

Thus, traditionally, service providers have had to deploy NIDs at subscriber locations 14 to act as a managed demarcation point for optically-fed Ethernet or IP services. These NIDs 18 are costly, consume power and space, and are an additional point of failure in the service provider's network 12. In most cases, optical Ethernet services use Small Form-factor Pluggable (SFP) optical transceivers to provide network-side connection of fiber facilities to a NID 18 (e.g., SFPs 20a) and downstream connection of fiber facilities to subscriber network devices or to other service providers (e.g., SFPs 20b and 26), as illustrated in FIG. 1.

In accordance with another approach, an SFP-NID can be deployed, which is a NID 18 that has only two physical ports and fits inside an SFP 26, XFP, or Xenpack module. It can also fit inside a dongle that could attach to Ethernet ports that support Power-over-Ethernet (PoE). An example of an SFP-NID is described in U.S. Patent Application Publication U.S. 2012/0182900 to Davari. An SFP-NID is powered by the host equipment that it attaches to, and does not require separate power supply. The differentiating factors of an SFP-NID, compared to conventional NIDs in the market illustrated in FIG. 1, are that it is much smaller and does not require external power. Therefore, it does not require extra space for installation.

As described in U.S. Patent Application Publication U.S. 2012/0182900, to Davari, the main function of an SFP-NID is to provide Layer 2 OAM capability for service providers, to check the status and health of the connections and services up to the SFP-NID. Other functions are rate adaptation, media conversion, and in-band management and configuration via SNMP modules and NMS interface. A more advanced SFP-NID could also provide added functions, such as security, policing, shaping, performance monitoring, statistics collection and header manipulation (such as MPLS, 802.1ad, and 802.1ah encapsulation).

A disadvantage of such SFP-NIDs is their ability to only perform Layer 2 testing. Thus, these Layer 2 testing devices are limited in that they cannot test connectivity across Layer 3 networks. A need therefore exists for an SFP or other device with compact form factor that can perform Layer 3 testing (e.g., at a subscriber's site) and is therefore capable testing across Layer 3 networks (e.g., traversing IP routers in addition to Ethernet switches within large public networks) as well as across Layer 2 networks.

Another disadvantage of such SFP-NIDs is that some require more power than the network device or host equipment can provide. For example, some network devices can only provide 1 Watt of power per SFP connected to it; however, some SFPs require 1.3 to 3 Watts of power. A need therefore exists for an interface for transceivers that can provide power to the SFP, or other type of transceiver, rather than power being supplied from the host equipment (e.g., via the SFP socket).

In addition, some SFPs can present considerable thermal issues. Depending on their processing load, SFPs may become quite hot to the human touch and can even pose a risk to damaging nearby electronics and other components and/or equipment due to excess heat. A need therefore also exists for an interface for transceivers that can dissipate heat.

Other issues can be presented when Network Interface Device (NID) functionality is incorporated within a Small-Form Pluggable optical transceiver or SFP to create a SFP-NID. For example, the equipment into which the SFP is plugged may be designed to ignore SFPs that are not sold by that equipment's vendor (e.g., the SFP has a code read from its EEROM that is invalid for that vendor's equipment) and thereby render the SFP-NID inoperative. Also, there may be an inadequate legal demarcation between network service providers and their subscribers when a service provider's SFP-NID is plugged into subscriber-owned and subscriber-powered equipment. Further, a SFP-NID may be longer or wider than a standard SFP in order to accommodate the necessary circuitry. The additional length may cause mechanical interference problems and/or create an extension that may be inadvertently damaged by accidental contact. In addition, miniaturization of a SFP-NID may limit its NID functionality (e.g., inadequate room to support the electronics needed to provide additional NID functionality).

SUMMARY OF THE INVENTION

The above and other problems are overcome, and additional advantages are realized, by illustrative embodiments of the present invention.

In accordance with an illustrative embodiment of the present invention, an enhanced SFP or other transceiver with compact form factor, or interface for an SFP or other transceiver, is configured to perform testing across Layer 3 networks (e.g., at a subscriber's site) and is therefore capable of testing across Layer 3 networks (e.g., traversing routers in addition to switches within large public networks) as well as testing across Layer 2 networks.

In accordance with aspects of illustrative embodiments of the present invention, a small form factor pluggable device (SFP) is provided that comprises: an optical interface; an electrical interface; a control unit configured to have an Internet Protocol (IP) address and link address; and a packet processing device coupled to the optical interface, the electrical interface and the control unit. The packet processing device is configured to determine if packets received from the optical interface are addressed to the link address, and provide each of the received packets to the control unit when it is addressed to the link address of the control unit and to the electrical interface when it is not addressed to the link address of the control unit, and provide packets received from either the control unit or the electrical interface to the optical interface. The control unit is configured to perform at least one of initiating a Layer 3 test request for transmission by the packet processing device via the optical interface, and generating a response to a Layer 3 test request in packets received via the optical interface, when the packets are addressed to the IP address, and transmitting the response via the packet processing device and optical interface.

In accordance with other aspects of illustrative embodiments of the present invention, a Layer 3 test request and a response to a Layer 3 test request are generated using a Layer 3 ping protocol wherein an echo request is transmitted from an initiator to a recipient with an IP address, and an echo response is provided to the initiator by the recipient in response to the echo request when the recipient is connected to the initiator.

In accordance with additional aspects of illustrative embodiments of the present invention, the Layer 3 ping protocol is selected from the group consisting of Internet Control Message Protocol (ICMP), IPv4 and IPv6.

In accordance with additional aspects of illustrative embodiments of the present invention, the packet processing device comprises buffers for receiving packets from the control unit and the electrical interface respectively, and is configured provide packets from the respective buffers to the optical interface in a selected order.

In accordance with aspects of illustrative embodiments of the present invention, the interface is configured to be connected between an SFP or other transceiver and a network device, host equipment or end device, to provide transceivers with additional functionality (e.g., testing across Layer 3 networks) without impacting compatibility with their corresponding network or host devices.

The universal interface is configured to couple a transceiver to an end device and to have electrical and/or optical coupling to additional circuitry configured to provide the transceiver with additional functionality such as Layer 3 testing. The additional circuitry comprises, for example: a packet processing device coupled to an optical interface and an electrical interface of the SFP or other type of transceiver; and a control unit coupled to the packet processing device and configured to have an Internet Protocol (IP) address and link address. The packet processing device is configured to determine if packets received from an optical interface are addressed to the link address, and provide each of the received packets to the control unit when it is addressed to the link address of the control unit and to an electrical interface when it is not addressed to the link address of the control unit, and provide packets received from either the control unit or the electrical interface to the optical interface. The control unit is configured to perform at least one of initiating a Layer 3 test request for transmission by the packet processing device via the optical interface, and generating a response to a Layer 3 test request in packets received via the optical interface, when the packets are addressed to the IP address, and transmitting the response via the packet processing device and optical interface.

The universal interface can be configured as an SFP extender, a dongle, or a box or other type of enclosure with removable lid. The universal interface can have a cable extending between it and the end device to locate the transceiver connected thereto distally from the end device.

The universal interface can be configured to facilitate delivery of power to the transceiver from a power source other than the end device.

BRIEF DESCRIPTION OF THE DRAWINGS

The invention will be more readily understood with reference to the illustrative embodiments thereof illustrated in the attached drawing figures, in which.

Throughout the drawing figures, like reference numbers will be understood to refer to like elements, features and structures.

DETAILED DESCRIPTION OF ILLUSTRATIVE EMBODIMENTS

Enhanced SFPs are described below in connection with FIGS. 1-5 that provide Internet Protocol functionality (e.g., using Layer 3 protocols such as IPv4, IPv6, ICMP, ICMPv6) for network layer (Layer 3) testing and not just physical layer (Layer 1) testing or data link layer (Layer 2) testing in accordance with illustrative embodiments of the present invention. As described below in connection with FIGS. 6-12, universal interfaces that operate between transceivers (e.g., Small Form-factor Pluggable (SFP) optical transceivers and other types of optical and electrical transceivers) and network equipment are provided which have additional transceiver functionality in accordance with illustrative embodiments of the present invention.

Enhanced SFPs

Figure 1:
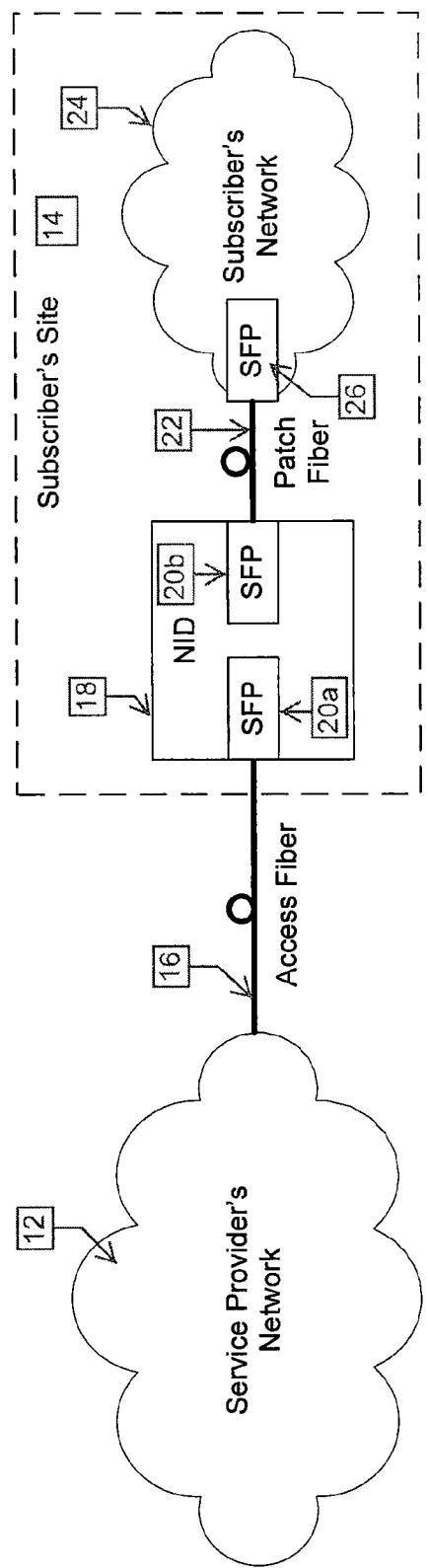
FIG. 1 is a block diagram of conventional networks, network elements, and network access facilities.
Figure 2:
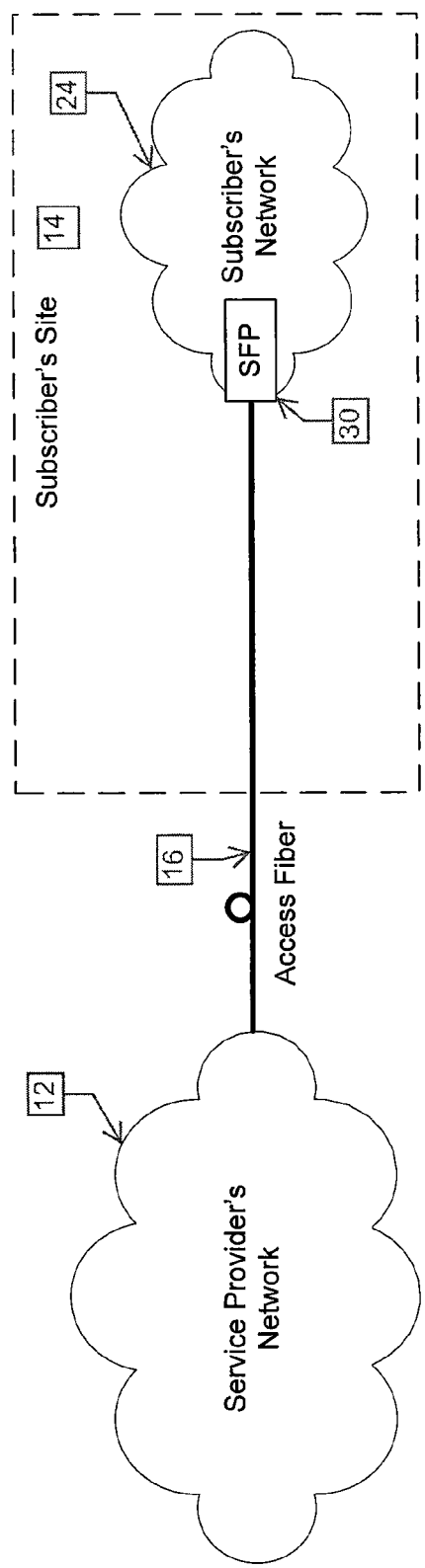
FIG. 2 is a block diagram of a network in which an enhanced SFP transceiver SFP with an ICMP function is deployed in accordance with an illustrative embodiment of the present invention.

In accordance with illustrative embodiments of the present invention and with reference to FIGS. 2 through 5, an alternate solution to the deployment of NIDs 18 at subscriber locations 14 is provided by utilizing an enhanced SFP transceiver 30 that incorporates the capabilities described below. The enhanced SFP transceiver 30 provides, for example, Layer 3 Internet Protocol (IP) layer management, which enables it to monitor connectivity up to the subscriber's equipment 14. Thus, unlike existing SFP transceivers 26, the enhanced SFP transceiver 30 can test connectivity across networks. Further, the enhanced SFP transceiver 30 plugs directly into a subscriber's switch or router, for example (e.g., as shown in FIG. 2), so it does not take up additional rack space. The enhanced SFP transceiver 30 consumes very little power, as would a conventional SFP transceiver 26, and can be manufactured at a very low cost, when compared to an NID 18.

As will be described below, the service provider 12 can ping an enhanced SFP transceiver 30 in accordance with illustrative embodiments of the present invention to verify connectivity, which is not possible with conventional SFPs 26. The enhanced SFP transceiver 30 uses, for example, Internet Control Message Protocol (ICMPv4) described in RFC 792 for IPv4 networks and/or Internet Control Message Protocol (ICMPv6) for the Internet Protocol Version 6 (IPv6) Specification described in RFC 4443 for such ping operations. The requests for comment (RFCs) are available from the Internet Engineering Task Force RFC repository maintained by IETF at www.IETF.org (e.g., http://tools.ietf.org/html/rfc792, and http://tools.ietf.org/html/rfc4443). It is to be understood that other Layer 3 protocols can be used in lieu of, or in addition to, IPv4, IPv6 and ICMP. The enhanced SFP transceiver 30 can generate an ICMP Echo Reply for any valid ICMP Echo Request received (e.g., from a service provider device) that is destined to the SFP transceiver's management entity. Likewise, the user is able to administratively configure the SFP transceiver 30 to generate ICMP Echo Request messages to any IPv4 or IPv6 host, for example. By using this technique, the service provider 12 is capable of verifying connectivity between switches and routers in their network and these SFP demarcation devices 30 located at subscriber sites 14.

As stated above in the background section, there are existing SFP transceivers that merely utilize Layer 2 diagnostics. However, the approach described herein in accordance with illustrative embodiments of the present invention leverages Layer 3 protocols to perform the testing, so the approach is capable of traversing IP routers in addition to Ethernet switches. In addition, conventional Layer 2 Service OAM entities that are used to support Y.1731 protocols (such as LBM/LBR) are difficult for the service provider to configure, as there are many parameters needed to properly set up Y.1731 maintenance points. The enhanced SFP transceiver 30 with Layer 3 testing (e.g., using ICMP Echo reflection) described in accordance with illustrative embodiments of the present invention conveniently uses the assignment of an IP address and subnet mask (e.g., and possibly gateway address) in order to function.

Figure 3:
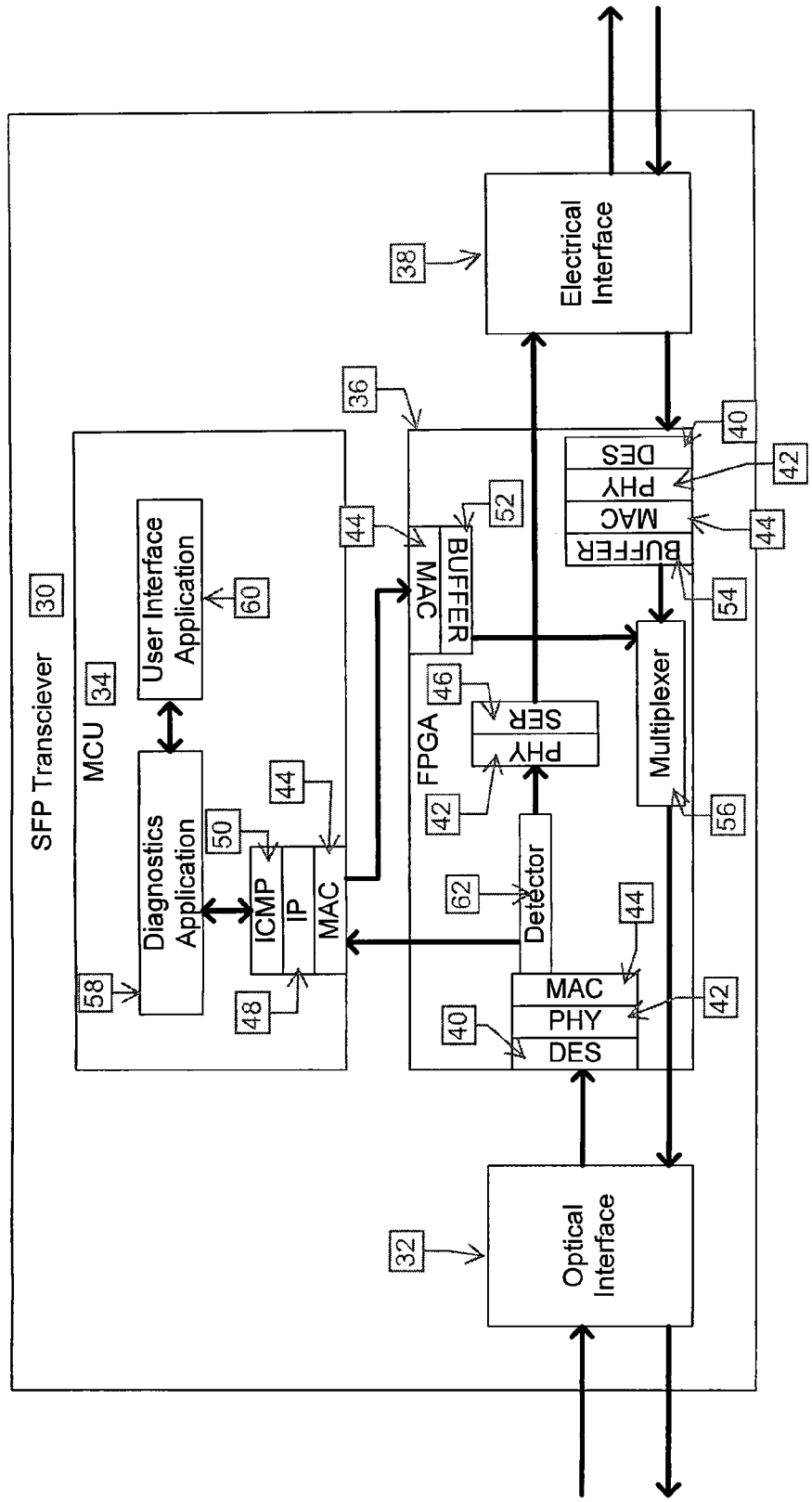
FIG. 3 is a block diagram of an enhanced SFP transceiver SFP with an ICMP function in accordance with an illustrative embodiment of the present invention.

FIG. 3 depicts functional blocks for an enhanced SFP transceiver 30 constructed in accordance with an illustrative embodiment of the present invention. It is to be understood that the enhanced SFP transceiver 30 can comprise additional functional blocks or components than those shown in FIG. 3 to implement other SFP transceiver operations. For example, although power circuitry is not shown in FIG. 3, the enhanced SFP transceiver can receive power in a conventional manner from the host device into which it is plugged. Further, the SFP transceiver 30 can be configured to also perform Layer 1 and/or Layer 2 diagnostics.

Unlike a conventional SFP transceiver 26, the enhanced SFP transceiver 30 comprises a field programmable gate array (FPGA) 36 on the forwarding plane between the externally-accessible electrical and optical interfaces 38 and 32, respectively. For example, the FPGA implements the IEEE 802.3 PHY sub-layer 42 and the IEEE 802.3 MAC sub-layer 44 for the optical interface supporting 10 Mbps, 100 Mbps and 1000 Mbps operation (e.g., reference IEEE Standard 802.3-2008). The MAC sub-layer 44 supports Jumbo packets up to 10,000 bytes in length. For example, the PHY sub-layer 42 converts the signal from Media Dependent Interface to Media Independent Interface for presentation to the MAC sub-layer 44. The MAC sub-layer 44 implements the Layer 2 functions by latching in an Ethernet Packet and checking to see if it has a valid FCS (i.e., Frame Check Sequence).

With continued reference to FIG. 3, the FPGA 36 further comprises deserializers (DES) 40 and serializer (SER) 46 are provided to convert serial streams of data to parallel streams of data and vice versa. A detector 62 checks a valid Ethernet packet in the MAC sub-layer 44 to see if the Ethernet Destination Address is equal to the Management Entity Ethernet Address (e.g., a MAC address assigned to the microcontroller control unit or MCU 34). For example, the detector 62 determines if packets received from the optical interface 32 are addressed to the MAC address of the MCU. If the MAC address of the packet is addressed to the MCU 34, the detector 62 forwards the packet to the MCU 34; otherwise, it forwards the packet to the electrical interface 38.

As shown in FIG. 3, the SFP transceiver 30 comprises an MCU 34 coupled to or otherwise in communication with the FPGA 36. The MCU 34 comprises a MAC sub-layer 44 (e.g., to receive packets from the detector 62 that are determined to be addressed to the Management Entity Ethernet Address assigned to the MCU 34). The MCU 34 then inspects each packet to ensure the destination IP address of the packet is addressed to the MCU 34. If so, the MCU processes the packet; otherwise, the MCU discards it. The MCU 34 further comprises an Internet Protocol functional block 48 (e.g., in the ISO OSI 7-layer model) that implements the IP stack for the SFP transceiver 30. The Internet Protocol functional block or layer 48 processes IP packets transmitted from the MAC sub-layer 44, and can generate IP packets towards the MAC sub-layer 44 in support of higher-layer applications such as ICMP and the User Interface application 60, and so on). The ICMP functional block 50 implements, for example, RFC 792 and RFC 4443.

With continued reference to FIG. 3, the MCU 34 comprises a Diagnostics application 58 that runs, for example, on the MCU 34's Operating System (OS). The Diagnostics application 58 takes commands from the User Interface application 60 and translates them to application programming interface (API) calls for the IP and/or ICMP sub-layers 48 and 50. The User Interface application 60 also runs on the MCU OS, for example, to provide a human-computer interface. This application presents data to the user (e.g., a human operator) and can take input from the user. It can take the form of a command line interface or even a Graphical User Interface (e.g., a web interface).

Thus, for example, the SFP transceiver 30 integrates an FPGA 36 that presents a Media Access Control (MAC) function that buffers and detects Internet Control Message Protocol (ICMP) Echo Request packets that are destined to or are received from the MCU 34. The FPGA 36 is capable of transmitting ICMP Echo Replies received by the MCU 34 out of the optical interface 32 transceiver without disrupting the transmission of other types of packets by the SFP transceiver 30. The MCU 34 runs an ultra-light operating system, for example, and an IP stack and is capable of generating an ICMP Echo Reply for each ICMP Echo Request received. When a packet is received at the SFP optical interface 32, it is buffered by the FPGA 36. The FPGA 36 scans the packet. If the packet's MAC Destination Address is equal to that of the SFP transceiver 30, the FPGA 36 will forward the frame to the MCU 34. All other frames will pass through the FPGA 36 transparently and be transmitted out of the SFP electrical interface 38. The MCU 34 will then further inspect the packet. If the packet contains a destination IP address equal to the IP address provisioned on the MCU 34 IP stack interface 48, and if the IP payload is an ICMP Echo Request packet, the MCU 34 will generate an Echo Reply message. When the MCU 34 generates an Echo Reply to an Echo Request received, it creates the packet and transmits it to the FPGA 36. The FPGA 36 buffers the packet (e.g., in the buffer 52). When there is an Inter-Packet Gap on the SFP electrical interface 38 receiver, the FPGA 36 begins to transmit the ICMP Echo Reply out of the optical interface 32. During this time, if a packet is transmitted to the electrical interface 38 receiver, the FPGA 36 buffers this packet (e.g., via buffer 54) until the transmission of the ICMP Echo Reply is complete, thereby preventing any undesirable packet discards involving the ping operation.

Figure 4:
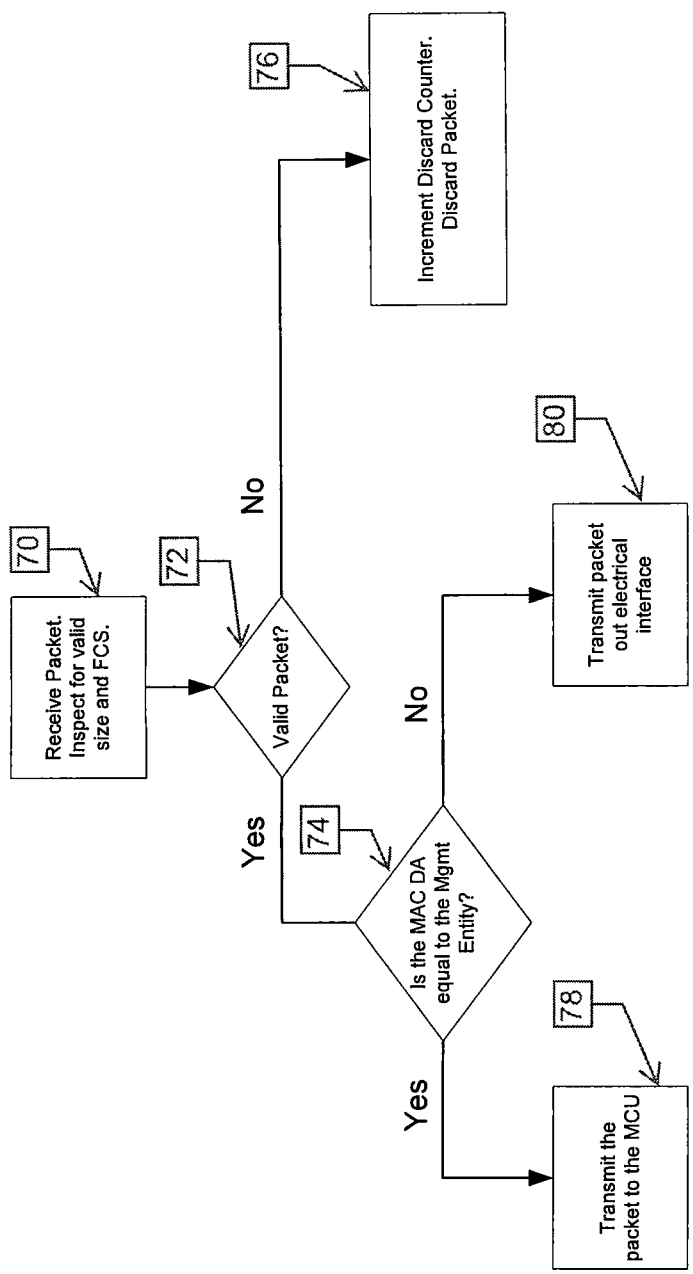
FIG. 4 depicts a process flow for an FPGA receive path in an enhanced SFP transceiver SFP with an ICMP function in accordance with an illustrative embodiment of the present invention.

FIG. 4 shows illustrative process logic for the receive path in the SFP transceiver 30 exemplified in FIG. 3 (e.g., the path from the optical receiver in the optical interface 32 to the electrical transmitter in the electrical interface 38). A packet is received at the optical receiver in the optical interface 32, is de-serialized and decoded, and is latched into the FPGA MAC 44, as indicated at 70. Undersized frames (a.k.a. runts) and packets with incorrect FCS values are declared as invalid frames and are discarded by the process programmed into the FPGA 36, as indicated at 76. A discard counter is kept in the FPGA 36 to keep a record of the quantity of discarded frames. Any packet deemed valid by the process of the FPGA 36, as indicated at 72, has its MAC Destination Address inspected, as indicated at 74. If the MAC Destination Address is equal to that of the SFP Management Entity (e.g., as determined by the detector 62), the packet is forwarded to the MCU 34, as indicated at 78. If the MAC Destination address is not equal to that of the Management Entity, then the packet is forwarded out via the SFP electrical interface 38, as indicated at 80.

For packets forwarded to the MCU 34, as stated above, are further inspected by the MCU to see if the Destination IP address is that of the Management Entity (i.e., the IP Address currently assigned to the IP interface 48). If so, the MCU 34 further processes the packet via the ICMP function block 50 to see if it is an ICMP Echo Request packet, for example. If so, the MCU 34 generates the appropriate ICMP Echo Reply packet, and transmits it out its MAC sub-layer to the FPGA 36. The ICMP 50 is configured to perform ping operations (e.g., echo initiation or reflection) for connectivity testing using a network protocol such as ICMP, IPv4, IPv6 or other Layer 3 protocol, as stated above. For example, if the packet forwarded to the MCU 34 is an ICMP Echo request, the MCU 34 is configured to send an ICMP Echo response via the ICMP sub-layer 50 to the MAC sub-layer 44 of the FPGA 36. Alternatively, the ICMP sub-layer 50 can be configured to initiate an ICMP Echo Request to another device via to the MAC sub-layer 44 of the FPGA 36 for transmission via the optical interface 32.

Figure 5:
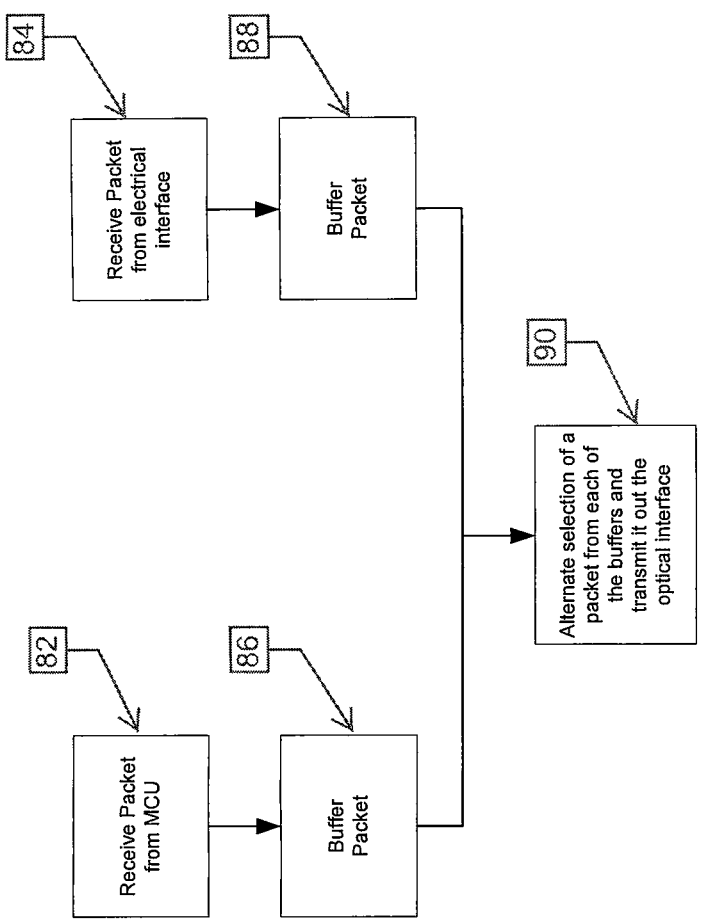
FIG. 5 depicts a process flow for an FPGA transmit path in an enhanced SFP transceiver SFP with an ICMP function in accordance with an illustrative embodiment of the present invention.

FIG. 5 shows illustrative process logic for the transmit path in the SFP transceiver 30 exemplified in FIG. 3 (e.g., the path from the electrical receiver in the electrical interface 38 to the optical transmitter in the optical interface 32). The FPGA 36 can receive packets to transmit out of the optical port from two sources: the MCU 34 or the SFP electrical interface 38, as indicated at 82 and 84, respectively. Since packets can present themselves at both interfaces 34 and 38 simultaneously, two buffers 52 and 54 are used to prevent packet loss, as indicated at 86 and 88. For example, the buffers can each be a First-In First-Out (FIFO) queue, that is, packets enter the tail of the queue and are scheduled for transmission out of the head of the queue. The FPGA 36 is configured to interleave these packets in a selected manner and transmit them out of the optical port at optical interface 32 by alternating selection of a packet for transmission from the head of each of the buffers 52 and 54 (e.g., in a selected order), as indicated at 90. If a buffer 52 or 54 is empty, the FPGA 36 simply moves to the next non-empty queue for packet scheduling, for example.

The illustrative embodiments of the present invention are advantageous because, among other reasons, no pre-configuration of service provider (SP) network elements is needed to exchange ICMP Echo requests or replies with an enhanced SFP transceiver 30 other than to know the IP address of the MCU 34. For example, existing SP network elements already support ICMP ping functionality with other types of devices. As stated above, the approach of using an SFP transceiver 30 with Layer 3 testing functionality exemplified by the illustrative embodiments in FIGS. 2 through 5 leverages Layer 3 to perform diagnostic testing for network connectivity and is therefore capable of traversing IP routers in addition to Ethernet switches within large public networks, which represents a significant advantage over existing SFPs 26 that merely utilize some Layer 1 or 2 diagnostics for physical layer or data link layer testing. For example, Layer 2 OAM can be used to test end-to-end across Layer 2 networks. An advantage of the illustrative embodiments of the present invention is that they can be used to test end-to-end across Layer 2 or Layer 3 networks. Very often, a service provider's Layer 2 network is used to provide connectivity between subscriber Layer 3 routers (CE). This would mean that, in FIG. 1, the SFP at 26 is actually installed in a subscriber's router. Layer 2 OAM would not be able to PING this router. Illustrative embodiments of the present invention allow a service provider or other entity to ping this router, in addition to any Layer 2 device that might make up the network cloud 12.

Universal Interfaces for SFPs

In accordance with illustrative embodiments of the present invention, a universal interface is provided that is configured to be physically disposed between network or host equipment (e.g., an end device such as a switch, router, edge device, interface, or other device separating a service provider network 12 and the subscriber network 24, system, or devices) and an SFP or other type of optical transceiver that is to be electrically and/or optically connected to the network or host equipment. The universal interface can be configured in accordance with various implementations of which some are described below in connection with FIGS. 6-11 in accordance with illustrative embodiments of the present invention. In addition to advantages realized by its physical configuration (e.g., a dongle, extender, enclosure, among other form factors) such as improved heat dissipation, the universal interface comprises circuit components to provide the coupled transceiver with additional functionality such as the Layer 3 testing functionality described above, a source of power other than power provided by host equipment, among other functions.

Thus, as will be described below, the various illustrative physical configurations of the universal interface can provide improved demarcation between network service providers and their subscribers (e.g., when a service provider's enhanced SFP is plugged into subscriber-owned and subscriber-powered equipment), improved dissipation of heat (e.g., generated by the coupled SFP), and better accommodation for circuitry for additional functionality and alternate power sources than conventional SFPs, among other advantages. For example, an enhanced SFP transceiver 30 with ICMP echo reflection electronics described above, for example, in connection with FIGS. 3 and 5 can transfer as much as 1.5 Watts over the SFP (e.g., due to the processing load of the electronics increasing the temperature of the electronics and surrounding SFP components), which needs to be dissipated over a larger area than that associated with the physical dimensions of a conventionally-sized, stand-alone SFP.

Figure 6:
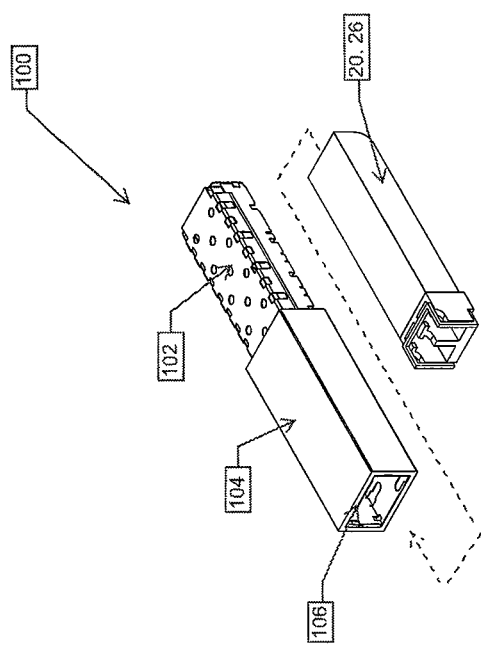
FIGS. 6, 7, 8, 9, 10 and 11 are perspective views of universal interfaces for coupling transceivers to network or host equipment in accordance with illustrative embodiments of the present invention.

With reference to FIG. 6, a universal interface 100 for transceivers (e.g., SFPs 20, 26 or other electrical and/or optical transceivers) has an extender form factor comprising a conventional connector 102 that can be inserted into a socket on network or host equipment, and a sleeve 104. The sleeve 104 comprises an opening 106 configured to receive a conventional SFP 20, 26, and additional circuitry 110 (not shown) that is described below in connection with FIG. 12 for providing additional functionality such as Layer 3 diagnostics. The sleeve 104 is advantageous in that it provides a heat sink to dissipate any thermal energy generated by the processing load of the additional circuitry 110, for example. The connector 102 can also facilitate heat dissipation.

Figure 12:
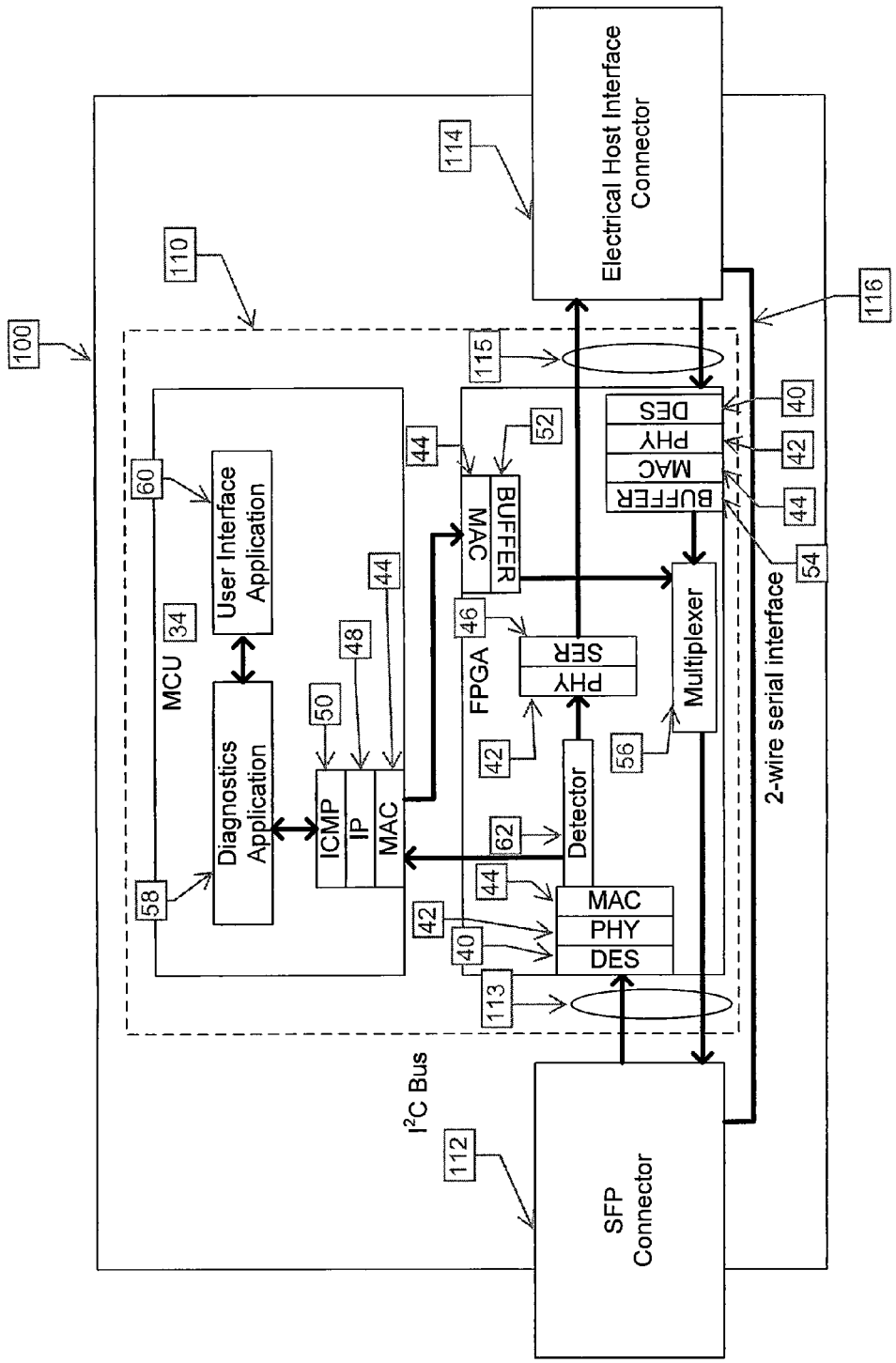
FIG. 12 is a block diagram of a universal interface in accordance with an illustrative embodiment of the present invention.

With continued reference to FIG. 6, the additional circuitry 110 in the sleeve 104 can comprise, for example, an FPGA 36 and an MCU 34 as described above in connection FIGS. 2 and 3. Unlike FIG. 3, wherein an enhanced SFP transceiver 30 comprises a FPGA 36 and MCU 34 on the forwarding plane between the externally-accessible electrical and optical interfaces 38 and 32, the FPGA 36 and MCU 34 or other components constituting the additional circuitry 110 can be provided on a printed circuit board (PCB) that is separate from the SFP and mounted in the sleeve 104. FIG. 12 depicts illustrative additional circuitry 110, which can be implemented using one or more electronic components such as an integrated circuit (e.g., a programmed processor or programmable gate array) with corresponding inputs/outputs (I/O) including I/Os mounted on a PCB and electrically connected to an SFP connector 112 and an electrical host interface connector 114. The SFP connector 112, for example, interfaces with an electrical interface of an SFP when it is inserted into the sleeve 104. The sleeve 104 or connector 102 can comprise the electrical host interface connector 114. The SFP connector 112 and the electrical host interface connector 114 are connected via a two-wire serial interface 116. Thus, the host device thinks the SFP 20 or 26 is directly installed, because the host device can read the 2-wire serial interface when the connector 102 is inserted into the socket of the host device.

FIG. 12 depicts functional blocks for the additional circuitry 110 and in accordance with an illustrative embodiment of the present invention. Many of the functional blocks have similar reference numerals to those depicted in FIG. 3 and can operate as described above in connection with FIG. 3. It is to be understood that the additional circuitry 110 can comprise additional functional blocks or components than those shown in FIG. 12 to implement other transceiver operations. For example, although power circuitry is not shown in FIG. 12, the universal interface 100 can allow the transceiver (e.g., SFP 20 or 26) to be provided with power from a source other than from the host device. Further, the additional circuitry 110 can be configured to also perform Layer 1 and/or Layer 2 diagnostics.

The illustrative universal interface 100 depicted in FIG. 6 is advantageous because the heat that may be generated via the additional processing power that may be required of the additional circuitry 110 to provide Layer 3 diagnostics or other transceiver functions can be dissipated over the increased physical dimensions of the sleeve 104, and to some extent the connector 102, rather than being confined to the smaller physical area of a stand-alone SFP-NID 30 as described above in connection with FIGS. 2 and 3. The universal interface 100 is also advantageous because it provides Ethernet demarcation in addition to performance monitoring, enabling service providers, wholesale carriers, and mobile operators to maintain service demarcation and service validation right from the universal interface and connected transceiver. Pulse Communication Inc.'s SFP-NID 30 or universal interface 100 with conventional SFP allows service providers to also receive real-time network and performance reports with per-Class of Service SLA definition.

As mentioned above, a disadvantage of SFP-NIDs 26 described in the background section above is their incompatibility with different vendors' equipment. For example, many vendors' network devices are proprietary and require vendor-compatible SFPs. Accordingly, these network or host devices will not recognize an incompatible SFP (e.g., will read an invalid code from an EEPROM in the SFP) and will ignore the SFP and may even shut down the port to which the SFP is connected. As described herein, illustrative embodiments of the universal interface 100 are advantageous because they allow vendor-specific SFPs to have additional functionality while still being recognized by their corresponding host device or equipment. For example, a universal interface 100 as shown in FIG. 6 can be connected to a socket in network or host equipment via the connector 102, and receive a conventional, vendor-compatible SFP 20 or 26 via its port 106, and provide additional functionality to that SFP 20 or 26 such as Layer 3 diagnostics. The host device interacts with the SFP 20 or 26 as if it is directly installed, because the host device can read the 2-wire serial interface when the connector 102 is inserted into the socket of the host device.

Figure 7:
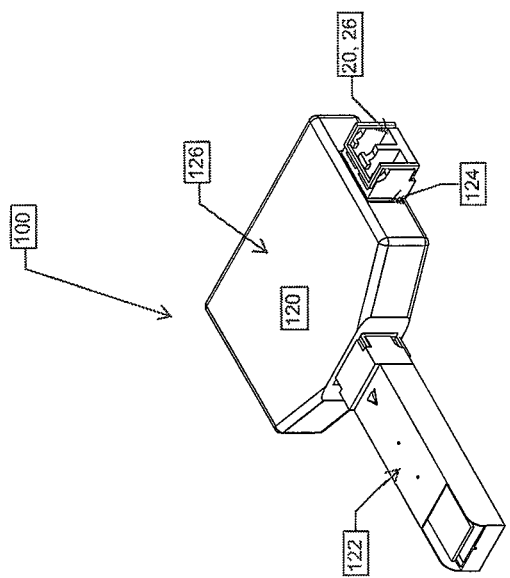

Reference is now made to another implementation of a universal interface 100 depicted in FIG. 7 in accordance with another illustrative embodiment of the present invention. The universal interface 100 is configured as a dongle 120 having a main body 126 for housing the additional circuitry 110 and a port 124 for receiving a transceiver such as an SFP 20 or 26. The dongle can also have a conventional SFP connector 122 extending therefrom for connecting to network or host equipment, although other connectors, cages or sockets can be provided for connecting the dongle 120 to the network or host equipment in a conventional manner.

The additional circuitry 110 can be provided on a PCB (not shown) or otherwise mounted in the main body 126 of the dongle, as explained above in connection FIGS. 6 and 12, and can operate to provide additional functionality to a conventional transceiver (e.g., an SFP 20 or 26) coupled to its port 124 such as Layer 3 diagnostics, among other functions. It is to be understood that the port 124 or connector can be configured to be electrically and/or optically coupled to other types of transceivers. Correspondingly, the additional circuitry 110 shown in FIG. 12 can be connected in a conventional manner to the interface(s) of the other types of transceivers in other to provide additional functionality thereto.

The dongle can have a form factor similar to that of a GP6100 SFP dongle available from Tecom Co., LTD., Taiwan, ROC, for example. It is to be understood, however, that the dongle can have other form factors, shapes or configurations as well.

The dongle is advantageous at least because the dimensions of the body 126 are larger than that of the transceiver itself (e.g., an SFP 20 or 26) and can therefore dissipate any thermal energy generated by the additional circuitry 110 faster than a standalone transceiver with the additional circuitry 110 such as the enhanced transceiver 30. Further, the configuration of the port 124 and the body 126 to provide electrical and/or optical coupling between a transceiver at the port 124 with the additional circuitry 110 in the body 126 allows for a conventional transceiver to be provided with additional functionality while also providing demarcation and supporting compatibility between the transceiver (e.g., an SFP 20 or 26) and the network or host device to which the dongle 120 is connected.

Figure 8:
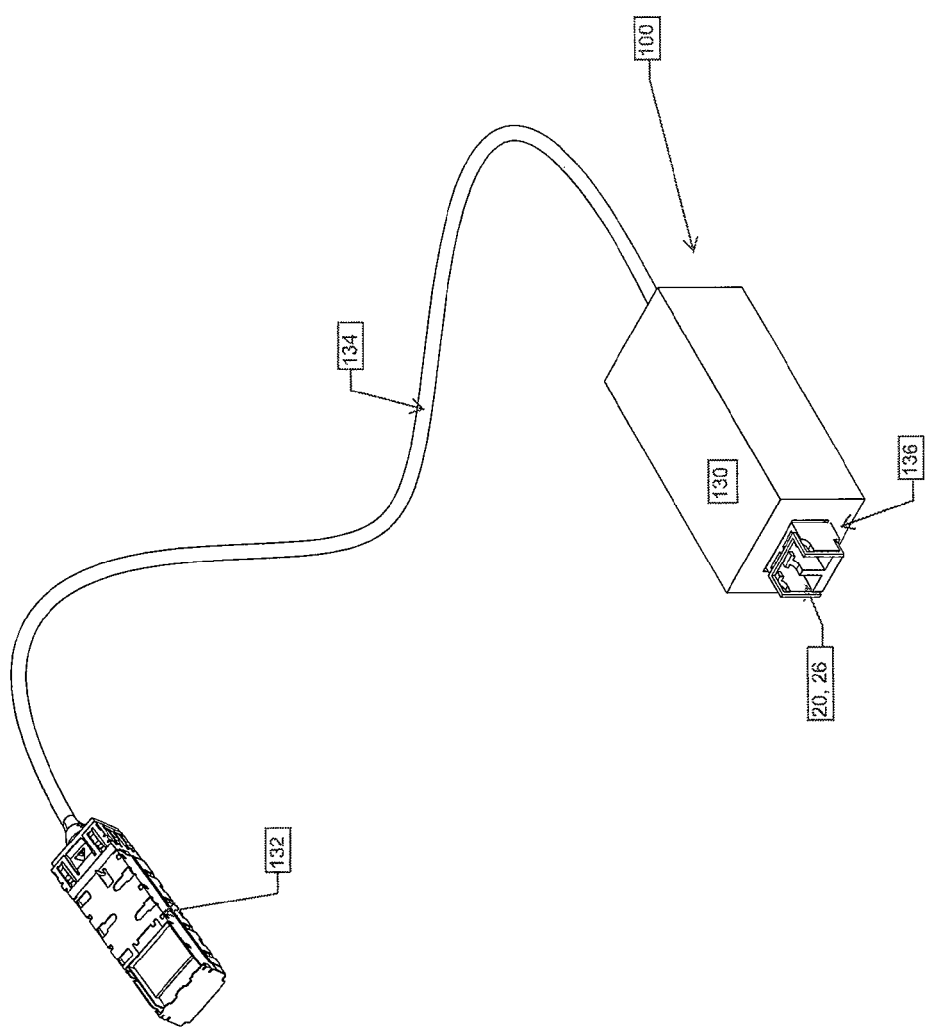

In accordance with another embodiment of the present invention, the universal interface 100 is configured as a dongle 130 with a cable 134 extending between it and a connector 132 as illustrated in FIG. 8. The cable 134 can be a standard electrical cable that connects the dongle 130 of universal interface 100 to the end equipment via the connector 132. The connector 132 is shown as a conventional SFP connector for insertion into a receptacle in a network or host device as specified in INF-8074 mentioned above, for example. The connector 132, however, can be configured as another type of connector, depending on the device to which it is connected.

The dongle 130 and cable 134 configuration is advantageous over the dongle 120 of FIG. 7, for example, when the area surrounding the receptacle of the host device is not big enough to accommodate a device having a profile or form factor larger than that of a conventional SFP. For example, some cards or rack equipment have multiple sockets or receptacles that are disposed next to each other with only a limited amount of space in between (e.g., the minimum clearance required to insert a conventional SFP into the port). The dongle 130 having a larger than permitted profile or form factor for the network or host equipment can still be used with such cards or equipment because the connector 132 is within the clearance dimensions associated with the corresponding port, whereas the dongle 130 can be arranged distally from the connector 132 and its receptacle or socket to the extent the cable 134 reaches. For example, in the case of rack equipment, the dongle 130 need not extend from rack equipment (e.g., as would the universal interface 100 configured as an SFP extender in FIG. 6) and therefore risk being bumped into by personnel walking past the equipment racks or otherwise create mechanical interface within the equipment space. Further, the dongle 130 need not encroach on space needed by a neighboring socket (e.g., as might a universal interface such as the dongle 120 in FIG. 7). The dongle 130 instead can be anchored or otherwise tied at a location separate from the allotted socket area such as above or below the equipment rack or tied nearby from a shelf or rack support structure.

Figure 9:
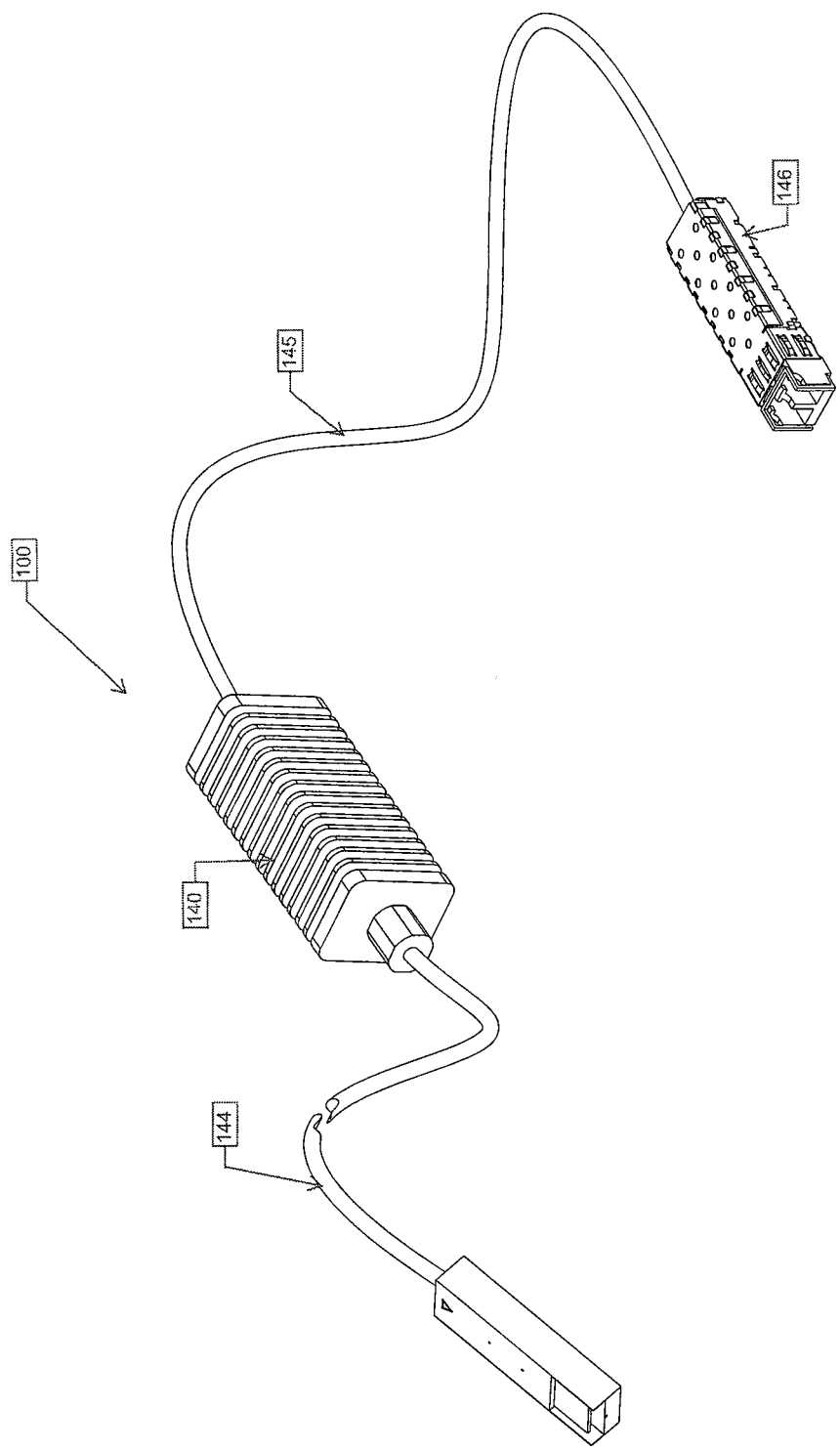
Figure 10:
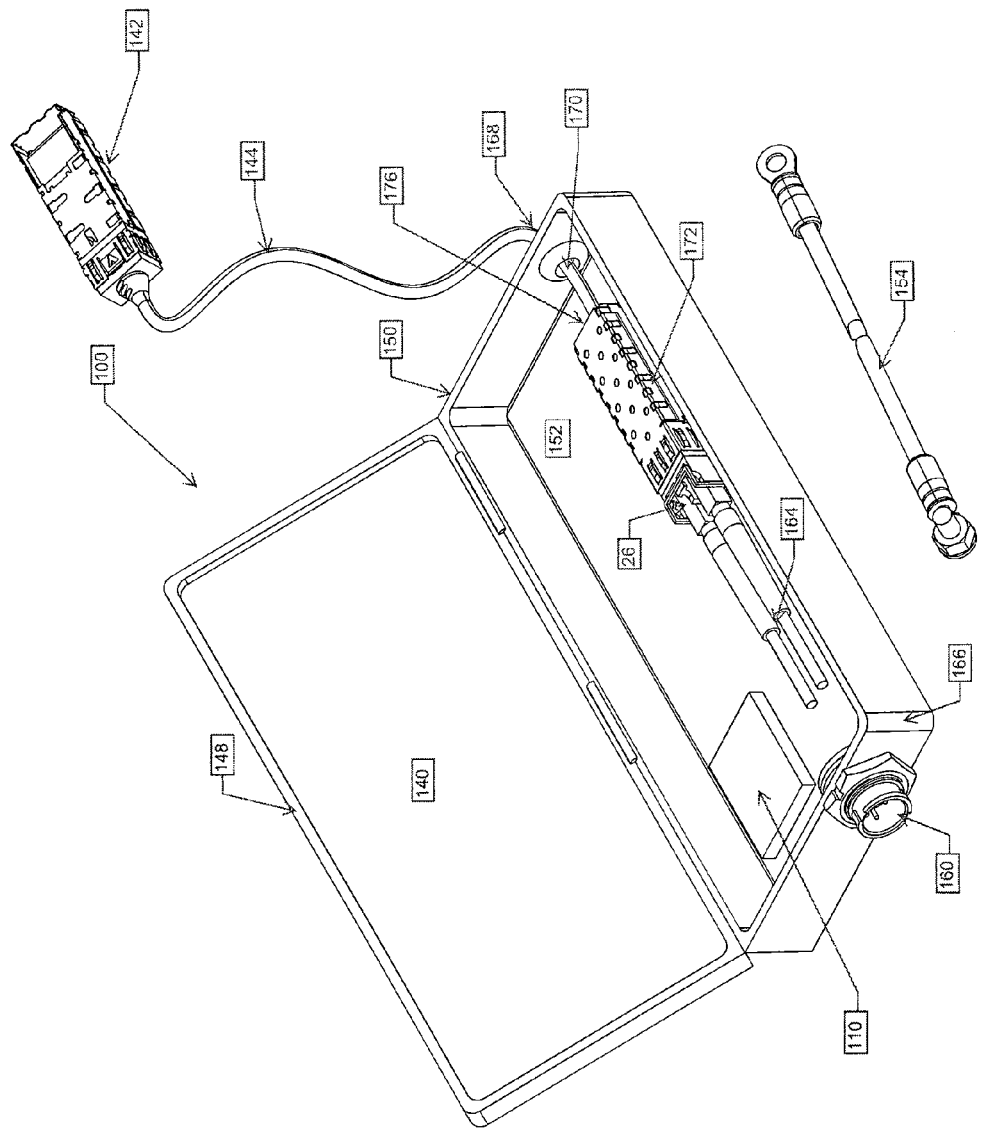
Figure 11:
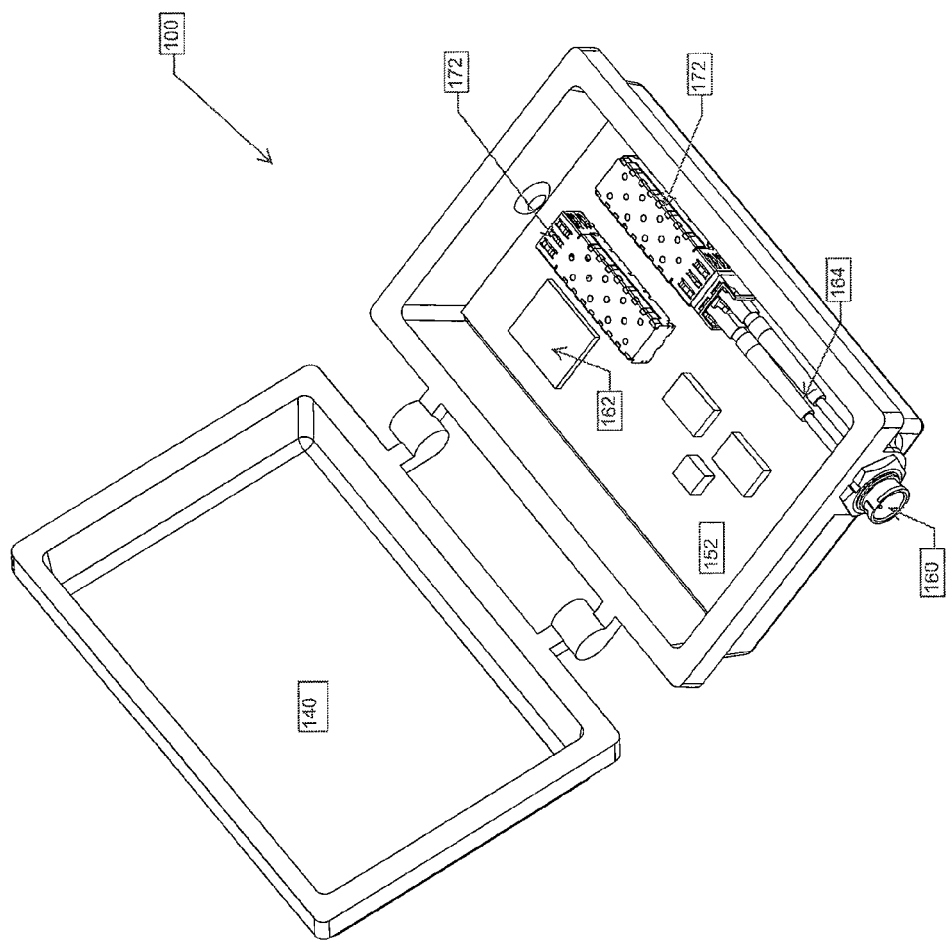

FIGS. 9, 10 and 11 illustrate different aspects of a universal interface 100 implemented in accordance with another illustrative embodiment of the present invention. As shown in FIG. 9, the universal interface 100 comprises a box or enclosure 140 having a cable 144 extending between it and a device connector 142. The connector 142 is illustrated as an SFP for insertion into a socket or receptacle of host or network equipment. Other types of connectors or cages 142 can be used depending on the intended socket, receptacle or port of the network device being connected to the box 140. A cable 145 coupled to an optical connector 146 is also shown for providing optical leads into the box 140.

As shown in FIG. 10, the box 140 has a lid 148 that is hinged or removably connected to the box base 150 and can be pressure mounted or snap fit against the perimeter of the base 150 or otherwise fastened to the base 150 to enclose the contents of the base 150. The lid 148 and box can be dimensioned or otherwise configured such that a weatherproof seal is created when the lid 148 is closed against base 150 to protect the contents of the box from exposure to weather conditions such as rain, wind, and so on. The base is provided with an aperture 166 through which optical inputs can be provided. For example, an Optitip® connector 160 available from Corning Cable Systems, Hickory, N.C. can be provided in the aperture 166 to connect optical cables (not shown in FIGS. 9 and 10) coming into the box to optical interface components therein such as a fiber patch cable indicated at 164. The base has another aperture 168 through which one end of the electrical cable 144 extends and can be sealed using a rubber grommet 170 or other connector.

Inside the box base 150, the optical leads 164 and cable 144 couple, respectively, with the optical and electrical interfaces of a transceiver (e.g., the optical interface 29 and the electrical interface 28 of an SFP 20 or 26). For example, an SFP cage 172 can be mounted on the PCB 152 for receiving an SFP 20 or 26. The fiber patch cable can be provided with sufficient slack for allowing a person to manually connect it to the optical interface of the SFP in the cage 172. The cable 144 can be connected to the cage 172 via a conventional electrical connector. The PCB 152 is configured with lead lines to the additional circuitry 110 (e.g., indicated generally at 110 or 162 on the PCB) from the electrical connector of the SFP 20, 26 in the cage and/or the interface of the electrical cable 144. As stated above, electrical interface of the transceiver (e.g., SFP 20, 26) and the electrical interface (e.g., a connector on the cable 144) of the host device are connected via a two-wire serial interface (e.g., indicated at 116 in FIG. 12). Thus, the host device thinks the SFP 20 or 26 is directly installed, because the host device can read the 2-wire serial interface when the other connector 142 of the cable is inserted into a socket of the host device.

Thus, the box 140 is configured to allow at least one conventional transceiver (e.g., SFP 20 to 26 or other type of transceiver, examples of which are provided below) to be connected therein and to provide additional functionality to that transceiver via additional electronics 110 provided on the PCB 152 in the base 150. For example, the additional electronics 110 are indicated generally as an integrated circuit on the PCB 152 and can comprise the FPGA 36 and MCU 34. It is to be understood that the additional electronics 110 may comprises fewer or more circuit components, as well as PCB leads (not shown in FIG. 10) to and from the transceiver interfaces (e.g., the lead lines shown between the FPGA 36 and optical interface 29 and the electrical interface 28 in FIG. 12).

As shown in FIG. 11, a cage 172 provides the optical connection to the network. Another cage 172' provides an SFP interface to connect to the CE. Thus, one end of an electrical SFP cable 144 can be connected to the cage 172', and the other end into the CE.

As stated above, the additional electronics 110 on the PCB 152 in the base 150 can provide more than Layer 3 diagnostics. Further, the PCB 152 can be provided with a power source or a power converter (e.g., an AC to DC converter or DC to DC converter) to receive power from a source other than the host equipment or end device and to provide that power or converted power to the transceiver connected inside the base 150. For example, the box 140 can be connected via a tie 154 near a rack of equipment or metro cell or other equipment having a power source, which can be supplied or converted and supplied to the transceiver 20 or 26 connected in the base 150. Auxiliary power may come from the AC main power in a lamp post also providing power to a metro cell. Another example is DC auxiliary power being provided by a second SFP port on connected equipment that was not in use to supply services. The ability to connect external power so that subscriber power (e.g., end device power) is not used to power the SFP-NID circuitry (e.g., the SFP 20 or 26) is advantageous to distinguish between network power loss and subscriber power loss. For example, service providers may want to determine if a service outage was caused by loss of subscriber's equipment power prior to dispatching a repair technician.

As stated above in connection with other illustrative embodiments, the additional electronics 110 are separated from the transceiver 20 or 26 in the base 150 (i.e., as opposed to being integrated therein per the SFP-NID 30) which allows for external heat dissipation with respect to the transceiver. Further, the ability to plug any conventional transceiver (e.g., SFP 20 or 26) into the box 140 permits any vendor's standard SFP to be plugged into the SFP-NID so that it can be recognized by the target equipment, while also benefiting from the added functionality provided by the additional electronics 110.

The illustrative embodiments in FIGS. 9-11 (e.g., wherein the universal interface 100 is a box or enclosure 150 with a cable 144 to a device connector 142) provide for an external demarcation to isolate subscriber and network equipment Such illustrative implementations in FIGS. 9, 10 and 11 are designed to avoid an SFP extension (e.g., universal interface 100 in FIG. 6) that may cause mechanical interference.

Instead, a plug 132 or 142 with attached cable 134 or 144 is inserted into an SFP socket in the equipment; the other end of the attached cable 134 or 144 extends to a small enclosure 130 or 140 that includes a standard SFP socket and NID circuitry. This external apparatus can accommodate additional NID circuitry should it be necessary for greater NID functionality.

Additional Illustrative Aspects of Enhanced SFPs and Universal SFP Interfaces

The service provider network 12 may represent a single communication service provider or multiple communications services providers. In one embodiment, the service provider network 12 is a metro Ethernet network utilizing any number of topologies and including various nodes, entities, switches, servers, UNIs, CPE devices, NIDs, and other communication elements. Communications within the service provider network 12 may occur on any number of networks which may include wireless networks, data or packet networks, cable networks, satellite networks, private networks, publicly switched telephone networks (PSTN), or other types of communication networks. The service provider's network is understood to be an infrastructure for sending and receiving data, messages, packets, and signals according to one or more designated formats, standards, and protocols.

As Ethernet services and circuits replace those of TDM within a communications environment, a replacement for standard demarcation devices are also needed. A demarcation device may allow a service provider 12 to monitor and troubleshoot circuits all the way to a specified demarcation point, such as the CPE device or NID. One embodiment of a demarcation device is a pluggable module such as an SFP transceiver 30, or a conventional SFP 20 or 26 with added functionality provided by a universal interface 100. However, the pluggable module may include any number of devices suitable for integration with the CPE device and demarcation functionality including, but not limited to, a gigabit interface converter (GBIC), SFP+, 10 gigabit (G) SFP (XFP), a Quad SFP (QSFP) supporting 10 G per channel (i.e., 40 G), a centum (C) or CFP transceiver (e.g., supports 10×10 Gbit/s and 4×25 Gbit/s variants of 100 Gbit/s interconnects), among other transceiver devices. For example, it is to be understood that the components described with reference to FIGS. 3 and 12 are not limited to deployment in an SFP but can also be implemented in an XFP, SFP+, QSFP, Xenpack module, or a dongle, among other transceivers. Further, the universal interface 100 can be configured with optical and/or electrical connectors and interfaces as needed to accommodate different types of transceivers besides an SFP such as, but not limited to, a GBIC, SFP+, CFP, XFP, QSFP, among other transceiver devices.

The service provider may perform testing and management for a connection or link between the data network 12 and subscriber 14. In particular, the service provider may perform testing as implemented through the SFP transceiver 30 or a conventional transceiver (e.g., SFP 20, 26, XFP, or QSFP and so on) coupled to a universal interface 100, in accordance with embodiments of the present invention, when integrated with a CPE device in the subscriber's network 14. In addition to Layer 3 testing, the tests may include performing loop back tests between the transceiver and the network 12. The service provider may measure frame loss, discarded traffic, throughput, and other traffic information between the transceiver, the CPE and the network 12. The transceiver 30, or conventional transceiver with the universal interface 100, provides a simplified system and method for implementing demarcation between a service provider 12 and a subscriber or customer 14, as well as various features and services.

A CPE device at the subscriber site 14 may be a router, switch, edge device, interface, or other device separating a service provider network 12 and the subscriber network 24, system, or devices. The CPE device may communicate with one or more networks through a fiber optic connection and an Ethernet connection. The CPE device may include a processor, a memory, a user network interface, a network interface, an SFP transceiver or at least an SFP transceiver port, among other components. The CPE device may communicate with any number of networks. In one embodiment, the CPE device may communicate with the networks through a fiber optic connection and an Ethernet connection. In another embodiment, both connections may be fiber optics or may utilize other communications standards, mediums, or processes. In one embodiment, the CPE device may communicate with the service provider through the fiber optic connection. Similarly, the CPE device may communicate with a subscriber network 14, equipment, or systems through the Ethernet connection 204. The CPE device may include any number of computing and telecommunications components, devices, or elements which may include busses, motherboards, circuits, ports, interfaces, cards, connections, converters, adapters, transceivers, displays, antennas, and other similar components.

Illustrative embodiments of the present invention can be implemented, at least in part, in digital electronic circuitry, analog electronic circuitry, or in computer hardware, firmware, software, or in combinations of them. The components of the SFP transceiver 30 can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Illustrative embodiments of the present invention have been described with reference to a programmed SFP transceiver 30, among other components. It is to be understood, however, that the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion.

Also, functional programs, codes, and code segments for accomplishing the present invention can be easily construed as within the scope of the invention by programmers skilled in the art to which the present invention pertains.

Method steps, processes or operations associated with an SFP transceiver 30 can be performed by one or more programmable processors executing a computer program to perform functions of the invention by operating on input data and generating an output. Method steps can also be performed by, and an apparatus according to illustrative embodiments of the present invention, can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

While the invention herein disclosed has been described by means of specific embodiments and applications thereof, numerous modifications and variations can be made thereto by those skilled in the art without departing from the scope of the invention.

What is claimed is:

1. A small form factor pluggable device (SFP) comprising:
    an optical interface;
    an electrical interface;
    a control unit configured to have an Internet Protocol (IP) address and link address; and
    a packet processing device coupled to the optical interface, the electrical interface and the control unit and configured to determine if packets received from the optical interface are addressed to the link address, and providing each of the received packets to the control unit when it is addressed to the link address of the control unit and to the electrical interface when it is not addressed to the link address of the control unit, and providing packets received from either the control unit or the electrical interface to the optical interface;
    wherein the control unit is configured to perform at least one of initiating a Layer 3 test request, and generating a response to a Layer 3 test request in packets received via the optical interface when the packets are addressed to the IP address, wherein an initiated Layer 3 test request is transmitted via the packet processing device and optical interface, and a generated response to a Layer 3 test request in packets received via the optical interface is transmitted via the packet processing device and optical interface.

2. The SFP of claim 1, wherein echo request and a response to a echo request are generated using a Layer 3 protocol wherein an echo request is transmitted from an initiator to a recipient with an IP address, and an echo response is provided to the initiator by the recipient in response to the echo request when the recipient is connected to the initiator.

3. The SFP of claim 1, wherein the Layer 3 protocol is selected from the group consisting of Internet Control Message Protocol (ICMP), IPv4 and IPv6.

4. The SFP of claim 1, wherein the packet processing device comprises buffers for receiving packets from the control unit and the electrical interface respectively, and is configured provide packets from the respective buffers to the optical interface in a selected order.

5. The SFP of claim 1, wherein the SFP is a transceiver selected from the group consisting of a gigabit interface converter (GBIC), an SFP+ transceiver, a 100 gigabit Centum form-factor pluggable (CFP), 10 gigabit SFP (XFP) transceiver, a 40 gigabit Quad SFP (QSFP), a pluggable transceiver supporting a selected denomination of gigabit per second interconnects or channels.

6. A universal transceiver for connecting a transceiver to host equipment, comprising:
    at least one of a port and connector for connecting to an optical interface on a transceiver;
    at least one of a port and connector for connecting an electrical interface on the transceiver to the host equipment;
    a control unit configured to have an Internet Protocol (IP) address and link address; and
    a packet processing device configured to be coupled to the optical interface, the electrical interface and the control unit, and to be operable to provide each of the received packets to the control unit when it is addressed to the link address of the control unit and to the electrical interface when it is not addressed to the link address of the control unit, and provide packets received from either the control unit or the electrical interface to the optical interface;
    wherein the control unit is configured to perform at least one of initiating a Layer 3 test request, and generating a response to a Layer 3 test request in packets received via the optical interface when the packets are addressed to the IP address, wherein an initiated Layer 3 test request is transmitted via the packet processing device and optical interface, and a generated response to a Layer 3 test request in packets received via the optical interface is transmitted via the packet processing device and optical interface.

7. A universal interface as claimed in claim 6, wherein each of the at least one port and connector for connecting to the optical interface and the electrical interface of the transceiver are configured to connect to a transceiver selected from the group consisting of gigabit interface converter (GBIC), an SFP+ transceiver, a 100 gigabit Centum FP (CFP), 10 gigabit SFP (XFP) transceiver, a 40 gigabit Quad SFP (QSFP), and a pluggable transceiver supporting a selected denomination of gigabit per second interconnects or channels.

8. A universal interface as claimed in claim 6, wherein the at least one port and connector for connecting to the electrical interface of the transceiver is configured to support a serial interface with the host device that enables the host device to verify that the transceiver is compatible with the host device.

9. A universal interface as claimed in claim 6, further comprising a power circuit to facilitate providing power to the transceiver from a power source other than the host device.

10. A universal interface as claimed in claim 9, wherein the power circuit comprises a power output to the transceiver, and at least one of an AC power supply, a DC power supply, a connection to an AC power supply, a connection to a DC power supply, and a power converter.

11. A universal interface as claimed in claim 6, further comprising
- at least one of a port and connector for connecting to an optical interface on a second transceiver; and
- at least one of a port and connector for connecting an electrical interface on the second transceiver to the host equipment;
- wherein the packet processing device is configured to be coupled to the optical interface of the second transceiver and to the electrical interface of the second transceiver.

12. A universal interface as claimed in claim 6, further comprising:
- an enclosure or container having a base portion and a top or cover for disposal on the base portion to enclose its contents;
- wherein the base portion contains each of the at least one port and connector for connecting to the optical interface and the electrical interface of the transceiver, the control unit and the packet processing device.

13. A universal interface as claimed in claim 12, further comprising a cable for communicating signals between the host device and the at least one port and connector for connecting to the electrical interface of the transceiver.

14. A universal interface as claimed in claim 13, wherein the cable is a designated length to dispose the box with the transceiver connected there in distally from the host device.

* * * * *